United States Patent [19]

Frankl

[11] 4,338,337
[45] Jul. 6, 1982

[54] METHOD FOR RECOVERING AND RECYCLING ANIMAL WASTE MATERIALS

[76] Inventor: Gerald P. Frankl, 187 McCook Lake, Jefferson, S. Dak. 57038

[21] Appl. No.: 133,534

[22] Filed: Mar. 24, 1980

[51] Int. Cl.³ .............................................. A23K 1/00
[52] U.S. Cl. ........................................ 426/55; 119/1; 210/622; 210/769; 426/623; 426/630; 426/636; 426/807
[58] Field of Search ............ 210/523, 408, 400, 195.1, 210/622, 769; 71/21; 119/16, 22, 28, 1; 100/118–120; 426/431, 478, 657, 807, 55, 630, 636

[56] References Cited

U.S. PATENT DOCUMENTS

| | | | |
|---|---|---|---|
| 996,624 | 7/1911 | Dorr | 210/523 |
| 1,292,237 | 1/1919 | Blomfield | 210/523 |
| 1,535,750 | 4/1925 | Tracy | 210/408 |
| 2,191,743 | 2/1940 | Scott | 210/523 |
| 3,773,659 | 11/1973 | Carlson | 71/21 |
| 3,873,450 | 3/1975 | Lovegreen | 210/400 |
| 3,884,811 | 5/1975 | Chattang | 210/408 |
| 3,950,562 | 4/1976 | Sonlor | 210/400 |
| 3,971,720 | 7/1976 | Swanson et al. | 71/21 |
| 3,979,296 | 7/1976 | Bastgen | 210/400 |
| 3,997,437 | 12/1976 | Prince et al. | 210/195.3 |
| 4,066,548 | 1/1978 | Olson et al. | 210/400 |
| 4,193,873 | 3/1980 | Thresher | 210/195.1 |

OTHER PUBLICATIONS

National Hog Farmer, Sep. 15, 1980, pp. 86, 87.

Primary Examiner—Theodore A. Granger
Attorney, Agent, or Firm—John E. Reilly

[57] ABSTRACT

A method for recovering and recycling animal waste materials permits the separation of the solids with a desired moisture content from the remaining liquids and finer solid particles and wherein the liquids and finer solid particles are converted into a high quality single cell protein by means of aerobic digestion so as to maximize the value and percentage of total solids reclaimed as well as to maintain excellent sanitation and minimize odors from anaerobic decomposition. The animal waste material is delivered from the barn or other suitable collection area by aerated aerobic water onto an inclined separator screen, at which point the waste material is incrementally advanced along the screen by a combination of shuttle-driven scraper blades and pressure pads so as to cause the excess moisture or liquid together with a minimal amount of the finer solids to pass through the separator screen while advancing the rest of the material off the end of the screen and from which it may be conveyed to a separate holding area. The separator mechanism of the present invention permits a larger percentage of the finer solid particles to attach to and remain with the larger solid particles which are recovered whereby to substantially increase the total digestible nutrient value of the solid waste material removed.

11 Claims, 11 Drawing Figures

Fig. 11

METHOD FOR RECOVERING AND RECYCLING ANIMAL WASTE MATERIALS

This invention relates to a novel and improved method for separating liquids and solids and more particularly relates to a novel and improved method and apparatus for recovering animal feed values from animal wastes and which is specifically adaptable for use in a closed system.

BACKGROUND AND FIELD OF THE INVENTION

It has been found in the past that a high percentage of animal waste materials can be converted into valuable animal feed and that such can be accomplished in a closed system without chemical treatment. For example, in my prior U.S. Pat. No. 3,982,499, I have disclosed an animal waste conversion and recovery system which has particular utility in livestock feeding in a confinement facility. As described in my patent, the waste material is flushed from the barn into a sump or basin, from which it is then pumped onto a wedge wire screen filter to separate excess liquid from the solid materials; and additional liquid is separated by means of a rotary press at one end of the screen so as to compress or squeeze excess moisture from the solid material as a preliminary to collection of the remaining solid material in a separate holding area. Any liquids and fine solid particles which pass through the screen are delivered into an aeration tank for aerobic treatment. The aerated liquid and waste material are then recycled through the confinement facility to aid in flushing additional waste material therefrom into the sump.

It is recognized that livestock convert a relatively low percentage of feed consumed into weight gain, the remainder being passed through the animal in the form of excrement. For instance, in the case of beef cattle approximately 28% of the feed consumed by beef cattle on a fattening ration is digested or utilized, and the remainder is passed through in the form of excrement. Accordingly, there is a tremendous economical potential not only in reclaiming the undigested solid portion of the feed, but also to increase the concentration of the total digestible nutrients in the feed.

In animal waste conversion systems now in use, such as, those disclosed in my prior patent, generally the percentage of total digestible nutrient value in the recovered waste has been found to be relatively low and can be largely attributed to the failure to retain many of the fine solids in the waste material, or solids, which are not filtered out in the separation stage. A good percentage of highly digestible proteins of high energy source are to be found in the fines or finer solid particles of the waste material and, if separated from the solid waste materials along with the excess moisture or liquid will greatly reduce the total digestible nutrient value in the solid waste material recovered. On the other hand, if some of the valuable and extremely fine solids are filtered through the screen with the excess moisture the fine solids will enhance the aerobic biological digestion process in the aeration tank. In other words, it is extremely important to strike a proper balance between the amount of fines permitted to pass through the screen with the liquids and the amount of oxygen induced into the aeration pit for the biological conversion of the fine solids which do pass through the screen, into single cell proteins. The high percentage of the solids which are removed are for conversion into semi-dry feed supplement. The moisture content of the solids removed is the means of harvesting, and is a part of the single cell protein which is derived from the biological digestion of the fine solids which are taken through the screen passing into the aeration tank.

SUMMARY OF THE INVENTION

It is therefore an object of the present invention to provide for a novel method for the efficient recovery and conversion of animal waste into animal feed values and wherein conversion takes place in such a way as to realize the highest or maximum concentration of total digestible nutrients.

It is another object of the present invention to provide for a novel and improved method for producing livestock feed supplements in a closed system which is readily conformable for use with various different livestock confinement facilities and yet permits recovery, conversion and reclamation in a minimum number of steps while maintaining maximum sanitation and being substantially odor-free.

A further object of the present invention is to provide for a novel and improved separating apparatus for selectively filtering selected percentages of solids and liquids from animal waste materials in such a way as to maximize the conversion of fine solids into a high quality single cell protein, rich in amino acids which is continuously harvested in the moisture content of the solids recovered or filtered from the waste material and recycling same to serve as a carrier medium for additional waste material and in such a way as to enrich the total feed recovered.

It is a further object of the present invention to provide for a novel and improved shuttle-type separator capable of incrementally advancing a slurry of liquid and solid materials across a screen and selectively removing a predetermined percentage of liquids and solids from the slurry as it is advanced thereacross while continuously cleaning the screen, and to accomplish same in a reliable but highly simplified manner.

In accordance with the present invention, there has been devised in a preferred embodiment thereof a closed system for recycling livestock wastes and converting same into animal feed having a maximum concentration of total digestible nutrients. The method and system of the present invention is conformable for use with various types of livestock confinement facilities but is best typified by describing its use in connection with hog and cattle barns wherein the waste material is collected in gutters in the barns and can be periodically flushed from the barns into a sump or basin as a preliminary to pumping the waste material to a separation stage. In the separation stage, the waste material is deposited at one end of an inclined screen having a limited mesh or opening size, the screen being inclined upwardly in a direction away from the point of deposition. A shuttle-type separator is suspended above the screen and includes a series or rows of scraper blades or wipers arranged at spaced intervals and in a direction transversely of the length of the screen. Interspersed at selected intervals but preferably toward the trailing end of the screen opposite to the point of deposition are rows of pressure pads which cooperate with the scraper blades in advancing the material across the screen as well as to compress a predetermined amount of moisture with a limited amount of fines from the solid waste material for recovery in a separate aeration stage or tank. The scraper blade and pressure pad assembly is operated in unison by an eccentric cam and linkage assembly, the latter being operative to convert the rotary motion of the cam into a linear to-and-fro motion so that the blades and pressure pads are caused to be lowered into engagement with the screen, advanced a limited distance across the screen to incrementally advance the waste materials, then are raised and reversed in direction back to their starting point to incrementally advance the waste materials over the next interval or limited distance across the screen. The pressure pads are located toward the trailing end of the screen and depending upon the characteristics and nature of the waste material, the number of pressure pads can be varied in order to compress and force any excess moisture along with a small amount of fines from the waste material prior to delivery off the end of the screen into a separate holding area; and furthermore the upper drive linkage for the pressure pads is preferably designed to impart a more positive pressure and advancing motion than the lower linkage for the scraper blades. The scraper blades will cooperate to some extent with the pressure pads in effecting partial compression and removal of excess liquid and fines during the early stages of movement of the waste material across the screen. In this relation, it has been found that incremental advancement coupled with selective compression of the waste materials greatly improves the control and efficient recovery of the desired amount of liquids and fines from the waste material for separate recovery in the aeration tank.

In the aeration stage preferably a submersible air inductor assembly is employed to most efficiently and continuously aerate the material so as to bring about the most complete aerobic digestion of the fines and conversion into single cell proteins. This liquid bio-mass is then recycled and employed as a flushing agent through the gutters of the confinement facility, or facilities, to recover additional waste material and to carry it into the aeration tank. The waste material so recovered can be conveyed or advanced at will into a separate storage for efficient recovery and recycling of the waste materials in the manner described.

The method and system of the present invention have been found to be extremely efficient and versatile. Specifically the separation stage is adaptable for use in connection with waste conversion with one or more confinement facilities or barns, either independently or simultaneously. For example, the system may be employed with cattle or hog barns either of the flow-through or flume type.

The above and other objects advantages and features of the present invention will become more readily appreciated and understood from the foregoing detailed description of a preferred embodiment when taken together with the accompanying drawings, in which:

DETAILED DESCRIPTION OF THE PREFERRED EMBODIMENT

Figure 11:
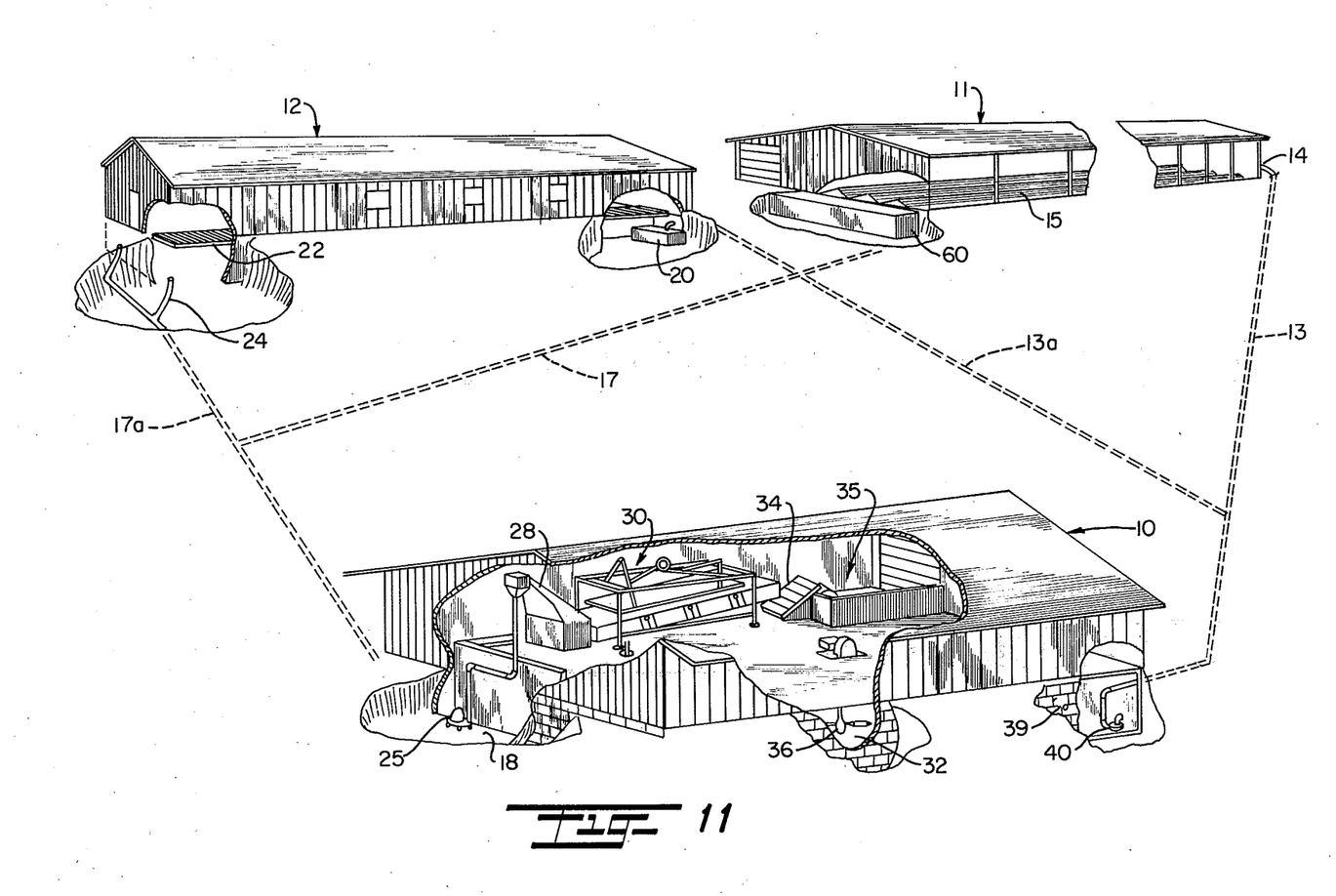
FIG. 11 is a somewhat schematic view illustrating the sequence of steps and arrangement of the various stages in an animal waste recovery method when carried out in association with a pair of confinement facilities.

The preferred method of the present invention is illustrated in FIG. 11 wherein broadly a waste treatment station 10 is provided for the recovery and conversion of animal waste into animal feed values, the animal wastes being delivered from a plurality of livestock confinement facilities. For the purpose of illustration and not limitation, the livestock confinement facilities may suitably comprise a flush flume cattle barn represented at 11 and a flow through, flush-type hog barn represented at 12. The cattle barn 11 corresponds to that described in my hereinbefore referred to Patent No. 3,982,499 in which a return line 13 delivers flush water from the waste treatment station into a flow splitter box 14, the latter being divided into as many parts as there are flumes or surge tanks 15 which traverse the length of the barn 11. The flumes are sloped downwardly away from the flow splitter box so that flush water delivered via the return line 13 will be evenly distributed across the flumes so as to carry animal waste material downwardly along the flumes into a collector trough 60 from which the waste-laden flush water can be delivered through line 17 into a sump 18 at the waste treatment station. Similarly, a flush water return line 13a extends to the upper end of the hog barn 12 to deliver the flush water into a weir or flush tank represented at 20. The weir causes the flush water to be spread evenly across the floor under the slotted grate 22 which traverses the entire length and breadth of the hog barn; and in a manner similar to that described with reference to the cattle barn 11 will carry the animal waste material collected by gravity feed to the lower end of the hog barn 12 where it is free to pass by gravity through a standpipe or drain represented at 24 into a delivery line 17A which extends into the sump 18 of the waste treatment station.

By way of illustration in the conventional type of flow-through hog barn, the weir 20 would extend across the end of a pit about 5" above floor level and is provided to spread the water evenly across the width of a pit for even distribution across the breadth of the slotted pit floor or gutters in the hog barn. The standpipe 24 at the lower end of the barn may for instance be on the order of 4" or 5" high so as to cause 4" or 5" of flush water to cover the floor at all times. The amount of flush water required to carry the manure solids out on a continuous basis and not permit any gases, odors or build up of solids is calculated by determining the amount of water being retained in the pit. For instance, in a pit which is 6' wide by 120' long and it is desired to retain 5" of water over the floor, a total of 2.214 gallons of flush water would be required to adequately cover the floor. Generally, this flush water in the barn should be displaced on the order of every three hours so that 12.3 gallons per minute is required to flow through the hog barn.

In the flush-type hog barn 12 a standpipe would not be required to retain any water. Instead, the weir 20 in combination with the pit operates as a flush tank to hold sufficient water so that, when released by a suitable valve at the bottom of the tank, it will flush the waste accumulation from the slotted grate at periodic intervals. In order to calculate the amount of flush water required for a barn which is 6' wide by 120' long and, assuming that 75 gallons per foot of width per 100' of length is required, a total of 540 gallons would be necessary to periodically flush the barn. If the barn is to be flushed every thirty minutes, 540 gallons divided by thirty minutes equals 18 gallons per minute in each flushing cycle.

In the flush flume cattle barn 11, generally it has been found more desirable to run the flush water continuously through the barn. For a barn which is provided with a series of four flumes, approximately 20 gallons per minute per flume is required to adequately flush the barn, or a total of 80 gallons per minute. The length of the barn is not a factor since a barn 100' long would require the same amount of flush water as a barn 1,000' long. With increasing length, however, it will be apparent that the amount of waste or solids per gallon would be proportionately greater. The collector trough 16 at the lower end of the barn merely collects the waste-laden flush water from the four flumes and directs it through the delivery line 17 into the sump 18 at the waste treatment station where it is collected along with the waste material recovered from the hog barn 12.

A submersible pump represented at 25 is suspended in the sloped bottom sump 18, and the pump 25 may suitably be a high volume low pressure centrifugal pump which is activated by a float switch, not shown, so that when the waste material in the sump 18 reaches a certain level it will be pumped into a primary separation stage 28. The primary separation stage 28 may be nothing more than an inclined screen or separator which slopes away from the discharge end of the conduit or discharge line 25' from the pump and correspond, for example, to the wedge wire filter screen described in my aforementioned U.S. Pat. No. 3,982,499. It should be pointed out that the primary screen or filter 28 is required more for large operations, for example, those carrying over approximately 3,000 head of hogs or 500 head of cattle. In smaller operations, no preliminary filtration or primary separation stage 28 is required, and the waste-laden flush water is pumped directly to the lower end of a mechanical shuttle separator 30 to be hereinafter described. Broadly, the separator 30 selectively removes a preselected amount or percentage of liquid and fines from the waste material and drains the same into an aeration tank 32. The larger solids are collected off of the upper end of the screen of the separator 30 and passed onto a conveyor 34 for removal of the solids into a stacking area represented at 35.

An air inductor assembly, as represented 1 at 36 is employed in the aeration tank 32 and preferably is an air inductor assembly as described in U.S. Application for Patent Ser. No. 849,965, filed Nov. 9, 1977. The air inductor assembly 36 is capable of aerating the liquids and solids which pass through the primary filter 28 and the mechanical shuttle separator 30 into the aeration tank 38. The air inductor assembly functions in a unique manner to induce air to flow from the surface through a venturi-shaped discharge zone for intimate mixture with the liquids and solids then recycles same throughout the aeration tank so as to circulate and uniformly distribute the air or oxygen throughout the tank. By breaking down the air into micro-sized bubbles and uniformly distributing it throughout the liquid and fine solids, the solids selectively passed through the filter will be aerobically digested and hydrolized with the solids converted into single cell protein matter. The aeration process is preferably continuous irrespective of the rate of delivery of the separation and removal of waste materials into the aeration tank. An outlet 39 is provided for removal of any excess or overflow from the aeration tank 32 into a suitable storage basin, such as, a lagoon or holding tank. In addition, the aeration tank 32 is provided with a submersible flush pump represented at 40 which maintains the desired flow of liquid or flush water from the aeration tank 32 back to the barns 11 and 12. The solid waste material which is not separated or passed through the screen at the separator 30 is conveyed from the upper end of the separator into the stacking or holding area 35. In a manner to be described, the moisture content of the solids is regulated by the separator 30 and by the amount of pressure applied to the waste material as it is advanced along the separator.

Figure 1:
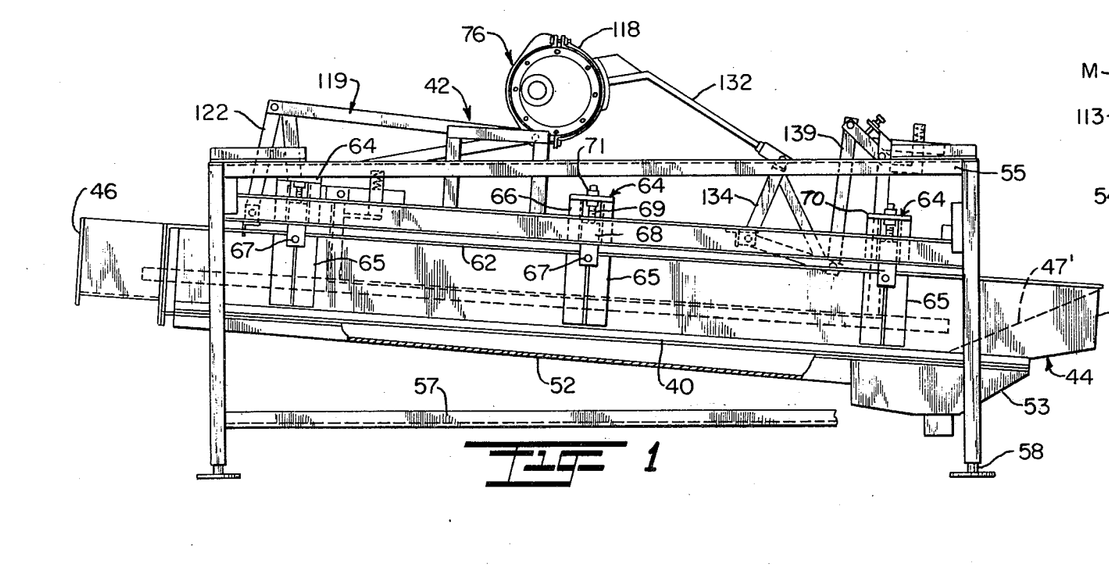
FIG. 1 is a front elevational view of a preferred form of mechanical separator in accordance with the present invention.
Figure 2:
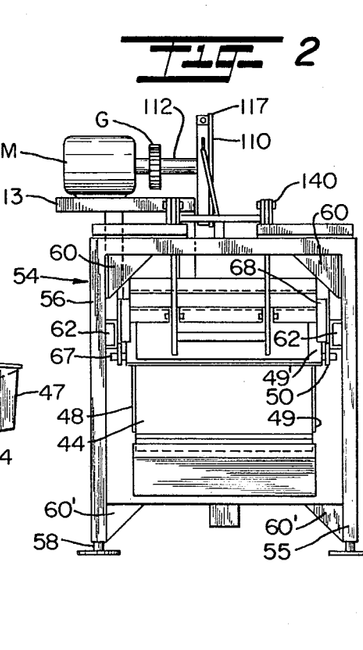
FIG. 2 is an end view of the separator shown in FIG. 1.
Figure 3:
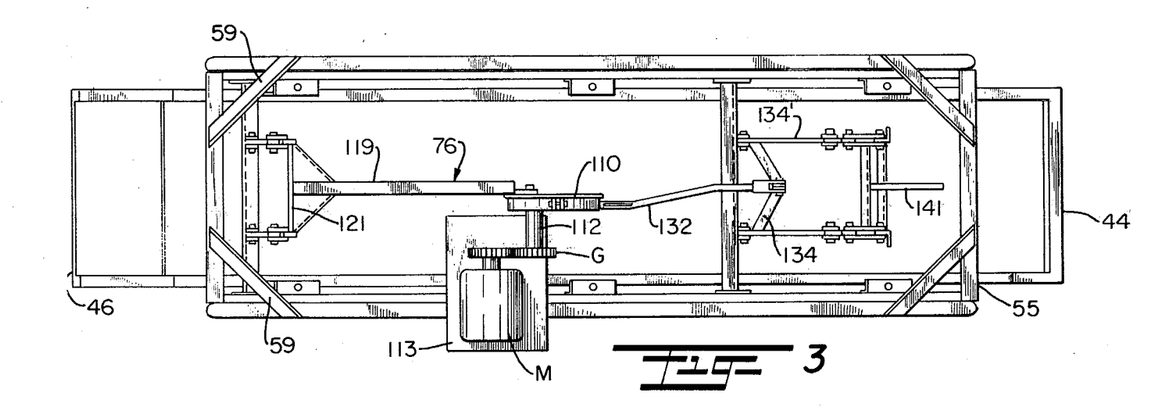
FIG. 3 is a top plan view of the preferred form of separator shown in FIG. 1.

An important feature of the present invention resides in the mechanical separator 30 which, as shown in FIGS. 1 to 11, is characterized by having a fixed, static or non-vibrating screen 40 and an upper, shuttle-driven wiper assembly broadly designated at 42 for incrementally advancing waste material across the screen 40 in such a way that the larger and more fibrous particles can operate as a filter or media for attachment of the fine solids, or fines, thereto so as to essentially remain within the mass of coarse solids as the excess moisture or water passes through the screen 40. Essentially, by avoiding the necessity of vibration to effect separation of the liquids and solids, it is possible to retain a much higher percentage of the fines within the coarser solid mass which is delivered from the end of the screen. At the same time, a small percentage of the extremely fine solids will pass with the liquid through the screen, these fines being the undigested or partially digested particles of soybean meal or other protein supplement which were used in supplementing the ration fed to the animals or in some cases may constitute powdered fractions and finally ground grain, again containing more starch, sugar and energy than the larger particles, such as, hulls from the grain or stems of the hay or silage being fed in a ration. Generally, the larger particles are more bulky, fibrous and lighter in weight and contain less protein and energy; whereas the fines generally constitute the most valuable part of the waste solids. It is therefore important to control the relative percentages or proportions of fines which pass through the screen in relation to that percentage which remains attached to the coarser solids which are delivered off of the end of the screen. To this end, and as illustrated in FIGS. 1 to 3, the screen 40 is of elongated, generally rectangular configuration and is preferably comprised of wedge wire screen sections having a mesh size in the range of 0.005" to 0.002" which are laid in side-by-side relation within the bottom of a separator trough 44. The trough 44 is of elongated, generally rectangular configuration having opposite ends walls 46 and 47 and sidewalls 48 and 49, an upper flange 50 extending around the upper periphery of the trough and a bottom wall 52 which slopes downwardly into a generally funnel-shaped drain or sump pan 53. A sloped shelf 47' inclines downwardly at one end 47 toward the lower screen section of the screen 40, and the opposite end 46 has a vertical wall.

Preferably, the trough 44 is adjustably suspended from a main frame 54 which is comprised of an upper, open rectangular frame portion 55 vertical legs 56 at the four corners of the frame and lower horizontally extending brace members 57 which make up a lower, open rectangular frame interconnecting the leg members and rigidifying the entire structure. The legs 56 are provided with vertically adjustable feet 58 to permit some limited adjustment of the height of the frame. Suitable braces are provided to further rigidify the frame including upper diagonal braces 59 across the corners of the upper frame, gusset plates 60 between the legs 56 and upper frame 55; and additional braces, not shown, may extend along opposite sides of the frame, for example, to run diagonally from the legs 56 between the upper and lower frames 55 and 57.

In order to adjustably suspend the trough 44 from the frame as described, generally channel-shaped beams or side rails 62 extend between the legs at opposite ends of the frame and along opposite sides thereof at an acute angle with respect to the upper frame 55. Cradles 64 serve to adjustably support the upper edge of the trough in spaced relation beneath the side rails there being a series of three cradles 64 spaced along opposite sides of the trough and each having a main, vertically extending flange or plate 65 attached to one of the outer sidewalls 48 or 49 of the trough, an upper plate member 66 attached to the inside of the side rail 62, and an inwardly projecting pin 67 at the lower end of an adjustable block 68 is inserted into an opening by an upper sidewall 48' or 49' on each side of the trough. Each pin 67 is suspended by a threaded rod 69 from an upper, horizontally extending support plate 70 at the upper end of the plate 66. Lock nuts 71 are threadedly connected to the rod 69 above and beneath the plate 70 so as to adjustably control the height or positioning of each pin 67 and in this manner regulate the spacing of the trough beneath the side rails, and scraper blade assembly, 62. Each of the cradles 64 can be independently adjusted to control the attitude or inclination of the trough with respect to the inclined side rails but are essentially mounted in such a way as to suspend the trough in spaced parallel relation to the side rails 62 so that the separator screen is inclined upwardly away from the point of deposition of the waste materials from the primary filter.

Figure 5:
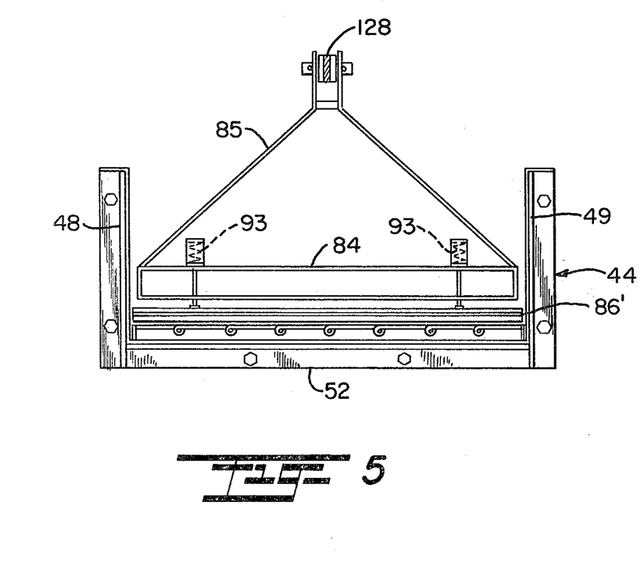
FIG. 5 is a sectional view taken about lines 5—5 of FIG. 1.
Figure 6:
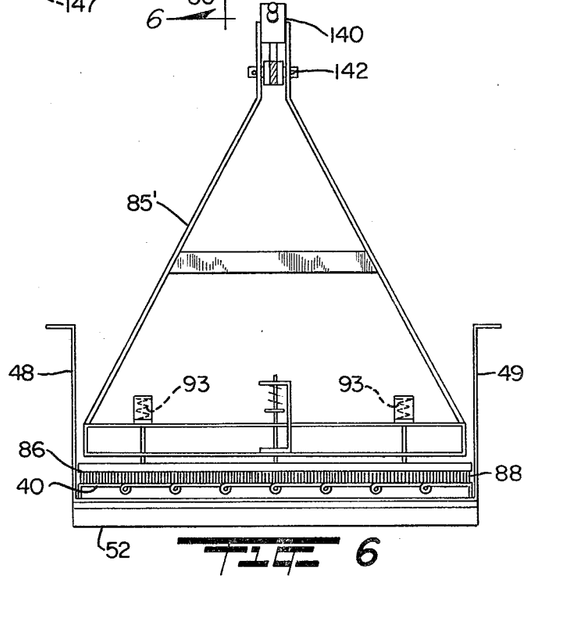
FIG. 6 is a sectional view taken about lines 6—6 of FIG. 1.

In order to advance the waste material at a smooth, gentle pace along the screen so as to retain a very high percentage of total solids in the waste material delivered from the upper end of the screen, the wiper assembly 42 is suspended from the upper shuttle drive 76 for linear to-and-fro movement across the screen. The wiper assembly 42 comprises a main frame 78, which as shown in FIG. 5, includes a pair of spaced, parallel, longitudinally extending beams 79 which are interconnected at opposite ends by subframe assemblies 80, each subframe having a transversely extending angle iron 81 to which the ends of the beams 79 are affixed, and outboard angle irons 82 which extend from opposite corners of each crossbeam 81 and have inward, angularly extending return members 83 permanently affixed to each of the respective beams 79. A subframe 84 of generally rectangular configuration is superimposed upon the main frame to extend along the greater length of the main frame from a point adjacent to the lower end of the main frame 76. An upper suspension frame 85 is attached to the upper end of the subframe 84 and a lower suspension frame member 86 is attached to the lower end of the subframe 84, the suspension members 85 and 85' serving as the motion transmitting elements between the upper shuttle drive 76 and wiper assembly 42 in a manner to be hereinafter described.

As a preliminary to describing the shuttle-type drive system, reference is made to FIGS. 6 to 11 which illustrate in detail the manner in which a series of scraper blades 86 and pressure pads 86' are suspended for downward extension from the main frame of the wiper assembly. The blades 86 are arranged for transverse extension at closely-spaced intervals along the lower end of the frame followed by a series of transversely extending pressure pads 86' extending in spaced parallel relation along the upper length of the frame, and a single blade 86 is positioned at the upper edge of the frame 76. Each wiper or scraper blade is preferably in the form of a paddle 88 of generally rectangular configuration and composed of a rubber or rubber-like material which is suspended from the main frame or beam member 79 by a plurality of lag bolts 89 extending downwardly through each frame 79 and each terminating in a threaded shank which is inserted into a threaded sleeve or socket 90 at the upper extremity of the paddle 88, and a lock nut 91 is wedged into a shallow recess or seat 92 at the upper edge of the sleeve 90 as specifically illustrated in FIGS. 7 to 9. Compression springs 93 are mounted on the frames 79 in surrounding relation to the bolts 89 to yieldingly urge the bolts 89 and attached scraper blade downwardly against the screen 40.

Figures 7, 8, 10:
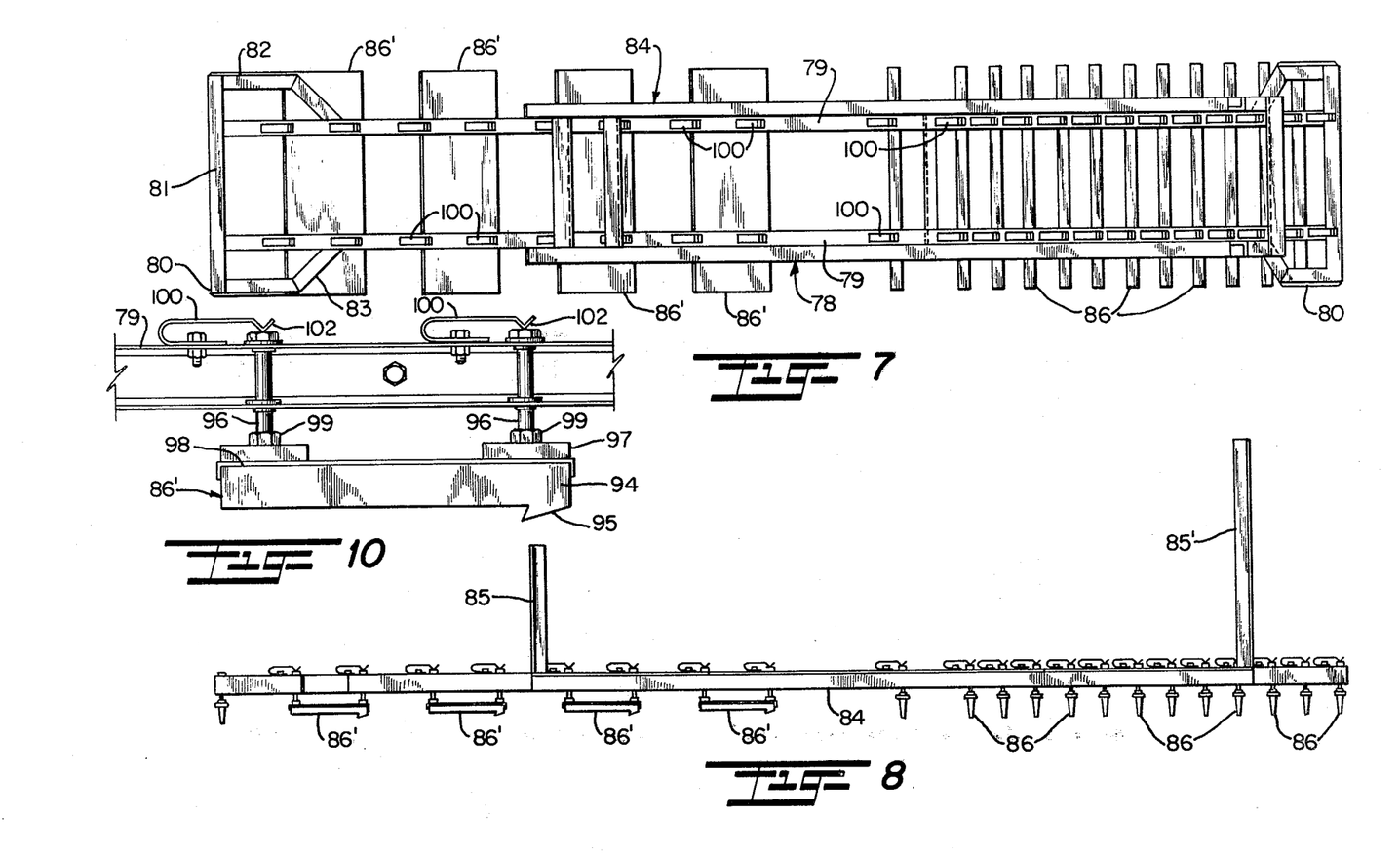
FIG. 7 is a plan view of a preferred form of scraper blade and pressure pad assembly employed in the separator of the present invention.
FIG. 8 is a front view of the assembly shown in FIG. 7.
FIG. 10 is a view in detail illustrating the spring loading of one of the pressure pad members and its mounting with respect to the separator frame.
Figure 9:
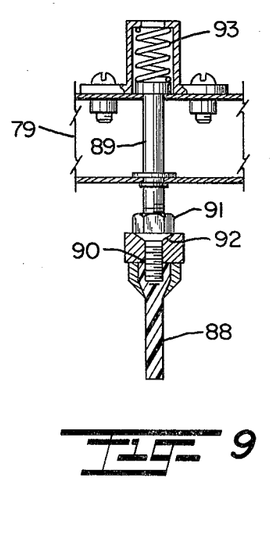
FIG. 9 is a cross-sectional view in detail of one of the wipers shown in FIG. 8.

The pressure pads 86', as shown in FIGS. 10 and 11, are each in the form of a horizontally extending block 94 having a downwardly projecting, tapered lip or rib 95 of generally triangular configuration. Each block 94 is composed of a rubber or rubber-like material and is suspended from each beam 79 by a pair of lag bolts 96 extending downwardly through the frame and having lower threaded shank portions inserted into the upper end of each block 94. Preferably, each block 94 is reinforced by a metal plate 98 which is sandwiched between the upper surface of each pad and the upper pad portions 97. Lock nuts 99 are tightened against the upper end surfaces of the pad portions 97 to positively but releasably secure the bolts 96 in place to the pads while leaving a limited space between the bottom surfaces of the beam 79 and the lock nuts 99 for limited vertical movement of the bolts and attached pad with respect to the beam. The pads 94 are yieldingly urged downwardly away from the beams 99 by means of leaf springs which for example may be of the type illustrated at 100 in FIG. 10 with the upper free ends 102 engaging the head ends of the bolts 96 so as to bias the bolts downwardly against the upper or top surface of the beams 79. In the alternative, compression springs 93 of the type employed on the paddles 88 may be used in place of the leaf springs 100, as shown in FIG. 5. In either form, the wiper assembly 76 comprised of the scraper blades 86 and pressure pads 86' are spring-loaded so as to be urged downwardly into engagement with the upper surface of the screen under the control of the shuttle drive 76.

Figure 4:
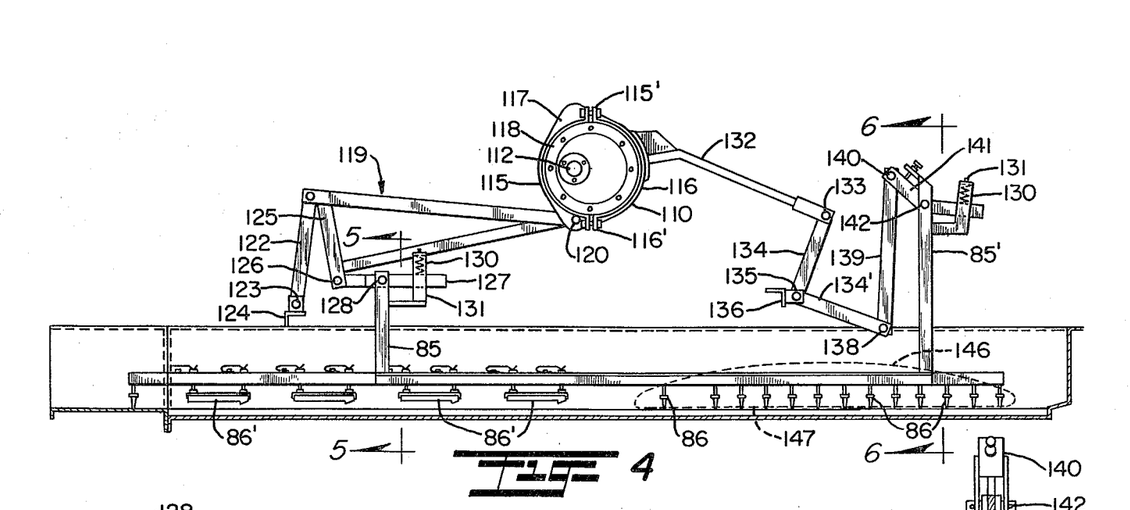
FIG. 4 is a view in more detail of the shuttle-type drive employed in the separator of the present invention.

In order to impart the desired linear to-and-fro movement to the wiper assembly 42, the preferred form of shuttle drive 76 employs an eccentric cam 110 which is mounted for rotation on a drive shaft 112, the latter rotated by a motor drive represented at M through a gear reducer G supported on a pillow block 113 on one side of the frame. Preferably, the motor drive is capable of generating up to 1750 rpms to the input side of the gear reducer which has a gear ratio on the order of 100:1 so as to reduce the speed of the drive shaft to the range of 12 rpms to 20 rpms. The cam 110 has an outer peripheral surface which receives a pair of upper and lower, arcuate bands 115 and 116 which are clamped together as at 115' and 116', respectively, and are free to ride in a channel formed between an outer flange portion 117 on the cam and a retaining ring 118 which is bolted to the front face of the cam. An upper generally triangular cam arm 119 is pivotally secured as at 120 directly to a surface of the cam 110 on the side opposite to the ring 118. As shown in FIGS. 3 and 4, the opposite end of the cam arm is pivotally connected by a support bracket 121 to the upper end of a downwardly directed, upper primary lever 122 which is pivoted at its lower end 123 to a fixed support bracket 124. A downwardly extending portion 125 of the cam arm has its lower end 126 pivotally connected to upper secondary link bar 127, the link bar 127 being pivotally mounted at 128 to the upper end of upper suspension frame 85 which extends upwardly from fixed connection to the subframe 84 of the wiper assembly 76. A compression spring 130 is mounted in a capped sleeve 131 with a spring-tension adjustment bolt located at the top of the sleeve which extends in spaced parallel relation to the upper suspension frame 85. The compression spring acts on the upper secondary link bar 127 to apply a downward pressure yieldingly to overcome the spring tension created by the springs 93 and 100. The spring 130 also yieldingly resists any tendency of the upper suspension frame 85 to rotate about the upper pivot 128; or, in other words, to rotate with respect to the upper secondary link bar 127.

The lower cam drive linkage is coordinated with the upper cam drive to impart synchronized linear to-and-fro movement to the lower end of the wiper or brush rack assembly 76. To this end, the lower linkage system includes a lower cam arm 132 which is angled first upwardly, then downwardly at a gradual angle away from the band 116 and is pivoted at 133 to a lower primary lever 134 which in turn is pivoted as at 135 to a fixed support bracket 136. The lower primary lever 134 is somewhat in the form of a bell crank having a lower arm 134' inclining downwardly and away from the pivot 135 for pivotal connection as at 138 to a linkage bar 139, the upper end of which is pivoted as at 140 to a secondary link bar 141. Link bar 141 is in turn pivotally attached as at 142 to a lower suspension frame 85' which is affixed to the lower end of the subframe 84. Another compression spring 130 and rod 131 are secured between the lower suspension frame 85' and link bar 141 to yieldingly resist rotational movement of the lower frame 85' about the pivot 142 and to apply downward pressure yieldingly to overcome spring tension created by the springs 93.

The bands 115 and 116 for the lower cam arm 132 are clamped together so as to permit the cam 110 to rotate the upper cam arm 119 independently of the lower arm 132, the latter following the eccentric motion of the cam about the axis of the shaft 112. As a result, the cam arms will impart coordinated pivotal movement through the linkage systems as described to cause the wiper assembly 42 to undergo a cycle of movement in which the scraper blades 86 and pressure pads 86' first are advanced downwardly into contact with the screen, move in a linear direction for a limited distance along the screen, then are gradually raised away from the screen and reversed in movement back to the original starting point on the screen. Although the movement of the wiper assembly can be generally characterized as a linear to-and-fro movement, it will follow the path, as represented in dotted form at 146 and 147, for the upper and lower ends of the wiper assembly, respectively. The upper linkage system as described, in following the rotational movement of the cam 110, imparts a somewhat greater pressure through the pressure pad rows 86' than is imparted through the scraper blades 86 by each pad being held down to the screen by springs 93 having a greater spring tension than the springs on the scraper blades, so that progressively increased pressure is exerted on the waste material in removing liquid therefrom as it is intermittently advanced along the screen. In the manner described, the scraper blades 86 and pressure pads 86' achieve the two-fold purpose of drawing the residual solids that remain on the screen together in ridges in front of the blades and pads as the free water and limited percentage of fines pass through the screen and, in so doing, constantly clean the screen openings so as to permit the free water to pass therethrough after repeated use. By imparting intermittent advancement to the solids along a stationary screen with the wiper elements, a higher percentage of total solid content is retained in the waste material and only a small amount of the solids, i.e., the solids smaller than the mesh size of the screen, are permitted to pass through with the water, since most of the finer solids will attach themselves to the larger solid matter. Those solids which pass with the liquid into the aeration tank are subjected to aeration by injecting a large volume of air into the flush water and through an extremely high rate of pumpage and mixing action, the micro-sized air bubbles formed are continuously mixed throughout the entire body of flush water being held in the tank. This intensifies the aeration and affords the necessary oxygen for complete aerobic digestion of the relatively small percentage of fines or nutrient solids which do pass through the screen as a preliminary to returning the flush water to the barns for carrying additional waste material back to the separator. In other words, the fine solids which do pass through the screen are converted into high quality single cell protein which is rich in amino acids and which can be continuously recovered in the moisture content taken of the solids from the surface of the separator screen.

The system as described is capable of harvesting in excess of 80% of the total solids coming from a given livestock operation. Not only is it capable of harvesting an extremely high percentage of the total solids recovered from the end of the screen, but also harvesting the fines that do pass through the screen in the form of single call protein which in turn enriches the feed recovered when the flush water is returned to the barns to carry additional waste material back to the separator. The solids that are taken from the screen preferably contain on the order of 70%–72% moisture unless the management of the system dictates either a lower or higher moisture content. The moisture content of the solids being removed may be controlled within limits to the desired moisture content by setting the pressure exerted on the pressure pads in the upper portion of the wiper assembly and choosing the desired number of pressure pads as described. A relatively low stream of fresh water may be introduced into the system upstream of the separator, particularly if a relatively high moisture level of solids is to be removed while maintaining the desired level of flush water in the system. On the other hand, it is possible to sustain a small amount of overflow from the system if drier than average moisture solids are to be removed, such as, less than 70%.

It is to be understood from the foregoing that while a preferred form of method and apparatus of the present invention have been set forth, it should be appreciated by those skilled in the art that various modifications, changes and adaptations may be made without departing from the scope of the present invention as defined by the following claims.

I claim:

1. In a system wherein animal waste material is recovered and converted into animal feed, and a screen having a coarser mesh size than the size of fines in the animal wastes is employed in the separation of the fines together with liquid from the waste material recovered while preventing clogging of the screen, the method of recycling the fines to prevent the loss of nutrient feed materials and of adding single cell protein into the animal wastes, comprising the steps of:
   (1) collecting the animal waste material in a collection area by flushing it with water into a central storage basin;
   (2) advancing the collected waste material from said storage basin onto the surface of a stationary screen;
   (3) advancing the waste material across the surface of the screen and simultaneously compressing the waste material against the screen to selectively remove the fines therefrom;
   (4) discharging the solid material remaining on the surface of the screen at one end of the screen opposite to that where loaded onto the screen;
   (5) collecting the liquid and fines which pass through said screen and are separated from the waste material into a liquid storage means;
   (6) aerating the liquid and fines sufficiently to hydrolyze essentially all of the fines in the liquids which have passed through the screen into single cell protein;
   (7) returning the liquid and single cell protein back to the collection area for reusage in flushing additional animal wastes and adding the single cell protein into the additional animal wastes for collection and loading onto the surface of the stationary screen as herein recited whereby essentially all of the fines smaller than the mesh size of the screen are collected and single cell protein has been added in the form of nutrients into the feed material.

2. In the system according to claim 1, said step of advancing the waste material across the screen surface further characterized by imparting a linear to-and-fro movement with scraper blades whereby to incrementally advance said waste material across said screen surface.

3. In the system according to claim 1, further including the further step of depositing all liquid and solid waste materials which do not pass through said screen into a storage area at the end of said screen opposite to the loading end of the screen.

4. In the system according to claim 1, further including the method step of incrementally advancing said waste materials along said screen.

5. In the system according to claim 4, further characterized by periodically transferring the water and single cell protein to said waste material collection area.

6. In the system according to claim 1, further characterized by depositing said waste materials on a screen inclining upwardly and away from the point of deposition.

7. In the system according to claim 1, including the step of advancing said waste materials from said storage basin onto a first inclined screen, and advancing said waste materials from said first inclined screen onto a second inclined screen.

8. In the system according to claim 7, and first inclined screen inclining downwardly away from the point of deposition of waste materials onto said screen, and said second inclined screen inclining upwardly and away from the lower end of said first inclined screen.

9. In a system according to claim 1, said screen being inclined in an upward direction away from the point of deposition of said waste materials thereon.

10. In a system according to claim 9, said separator means including a common frame from which said scraper blades are suspended, and said shuttle drive means including an upper eccentric cam member and a pivot link assembly interconnecting said eccentric cam and said scraper blade frame to convert the rotational motion of said cam into shuttle-type movement of said scraper blades.

11. In a system according to claim 10, said scraper blade frame including means spring-loading said scraper blades to yieldingly urge said scraper blades in a downward direction toward the surface of said screen, and said separator means having horizontally disposed pad members at spaced intervals between and parallel to said scraper blades, each of said pad members including a downwardly projecting lip at the forward edge of said pad member movable into engagement with the surface of said screen.

* * * * *